US012632584B2

(12) United States Patent
Pinheiro et al.

(10) Patent No.: US 12,632,584 B2
(45) Date of Patent: May 19, 2026

(54) SYSTEMS AND METHODS FOR ATTRIBUTE BASED ACCESS CONTROL ON A DATA LAKE

(71) Applicant: WELLS FARGO BANK, N.A., San Francisco, CA (US)

(72) Inventors: Ralph Pinheiro, Paoli, PA (US); Mouli Ravilla, Glen Mills, PA (US); Jagat S. Dhami, Fuquay Varina, NC (US); Prashanth Reddy Balaiahgari, Pflugerville, TX (US); Satish Katakam, Exton, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 41 days.

(21) Appl. No.: 18/918,964

(22) Filed: Oct. 17, 2024

(65) Prior Publication Data

US 2026/0111581 A1     Apr. 23, 2026

(51) Int. Cl.
*G06F 21/62* (2013.01)
*G06F 21/10* (2013.01)

(52) U.S. Cl.
CPC ...... *G06F 21/6218* (2013.01); *G06F 21/1012* (2023.08)

(58) Field of Classification Search
CPC ............. G06F 21/6218; G06F 21/1012; H04L 63/101; H04L 63/102; H04L 63/105
See application file for complete search history.

(56) References Cited

U.S. PATENT DOCUMENTS 8,069,147 B2 * 11/2011 Blazejewski ......... G06F 16/258
                                                                    707/783
10,445,521 B1 * 10/2019 Hartlaub ................. G06F 7/523
(Continued)

FOREIGN PATENT DOCUMENTS

CN          118796821 A   * 10/2024   ......... G06F 21/6245

OTHER PUBLICATIONS

G. Ramesh, N. V. Sivareddy, L. H. Jasim, P. Murugeswari, B. Kumaraswamy and M. L, "AI-optimized data Lakes for Real-Time Big Data Management and Autonomous Query Optimization," 2025 International Conference on Metaverse and Current Trends in Computing (ICMCTC), Subang Jaya, Malaysia, 2025, pp. 1-5 (Year: 2025).*

*Primary Examiner* — Khalid M Almaghayreh
(74) *Attorney, Agent, or Firm* — Kilpatrick Townsend & Stockton LLP

(57) ABSTRACT

Systems and methods for attribute based access control on a data lake. The systems and methods include receiving a data file and metadata associated with the data file, storing the data file in a database and storing the metadata in a data catalog. The metadata is assigned a domain access configuration and an attribute access configuration. The systems and methods further include receiving a query for the data file from a user, where the user is assigned a persona, where persona comprises a permission level. Syntax of the query is evaluated in addition to access to the query through steps including evaluating the permission level of the assigned persona against the domain access configuration and evaluating the permission level of the assigned persona against the attribute access configuration. In response to determining that the query fails to satisfy one or more of the evaluations, the query is then rejected.

16 Claims, 7 Drawing Sheets

(56)                    References Cited

U.S. PATENT DOCUMENTS

|  |  |  |  |  |
|---|---|---|---|---|
| 11,431,665 | B1* | 8/2022 | Ali | H04L 12/1822 |
| 2006/0248045 | A1* | 11/2006 | Toledano | G06F 16/258 |
| 2009/0254971 | A1* | 10/2009 | Herz | G06Q 10/10 |
|  |  |  |  | 726/1 |
| 2012/0095984 | A1* | 4/2012 | Wren-Hilton | G06F 16/9538 |
|  |  |  |  | 707/707 |
| 2014/0046926 | A1* | 2/2014 | Walton | G06F 16/20 |
|  |  |  |  | 707/710 |
| 2020/0311293 | A1* | 10/2020 | Hartlaub | G06F 7/523 |
| 2021/0216893 | A1* | 7/2021 | Roden | G06N 5/04 |
| 2021/0258321 | A1* | 8/2021 | Vegulla | G06N 5/04 |
| 2022/0400112 | A1* | 12/2022 | Cavalcanti | H04L 63/102 |
| 2023/0185952 | A1* | 6/2023 | Carru | G06Q 30/06 |
|  |  |  |  | 726/26 |
| 2023/0370467 | A1* | 11/2023 | Cavalcanti | H04L 63/105 |
| 2024/0330500 | A1* | 10/2024 | Zaret | G06F 21/602 |
| 2024/0393962 | A1* | 11/2024 | Gupta | G06F 3/0673 |
| 2025/0272252 | A1* | 8/2025 | Vangireddy | G06F 12/1441 |

* cited by examiner

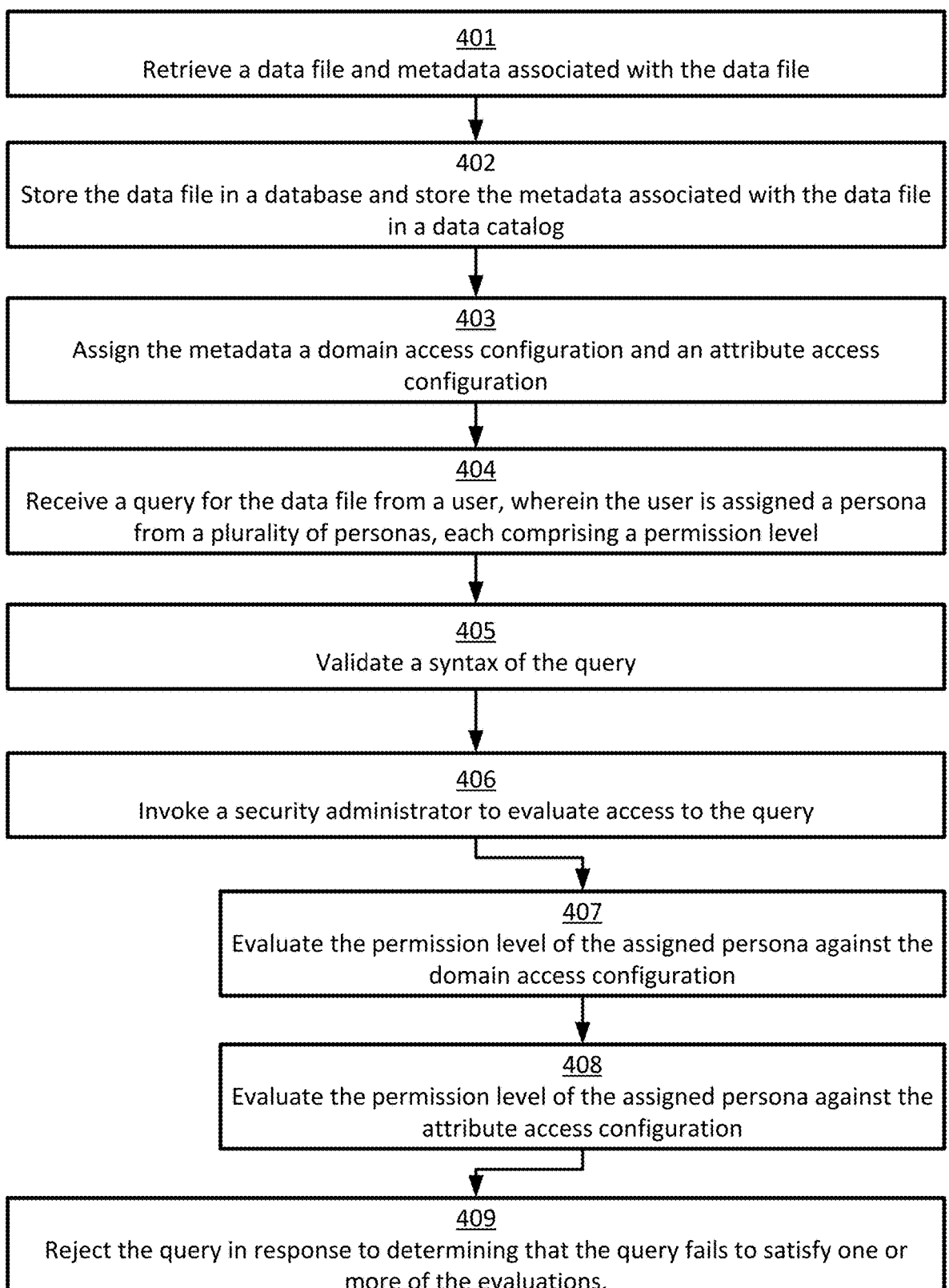

401
Retrieve a data file and metadata associated with the data file

402
Store the data file in a database and store the metadata associated with the data file in a data catalog

403
Assign the metadata a domain access configuration and an attribute access configuration

404
Receive a query for the data file from a user, wherein the user is assigned a persona from a plurality of personas, each comprising a permission level

405
Validate a syntax of the query

406
Invoke a security administrator to evaluate access to the query

407
Evaluate the permission level of the assigned persona against the domain access configuration

408
Evaluate the permission level of the assigned persona against the attribute access configuration

409
Reject the query in response to determining that the query fails to satisfy one or more of the evaluations.

SYSTEMS AND METHODS FOR ATTRIBUTE BASED ACCESS CONTROL ON A DATA LAKE

FIELD OF INVENTION

The present disclosure generally relates to access control in data storage systems, and more specifically to systems and methods for attribute based access control on data lake data storage systems.

BACKGROUND

With the growth of machine learning, internet of things connectivity, and other modern big data technologies, the number of data types and the rate that data is generated and stored within databases has grown exponentially. In order to facilitate the storage and analysis of such data, new formats of data storage are necessary. Data lake environments consist of centralized repositories drawing from one or more physical databases allowing for the storage of vast amounts of data. Data lakes are designed to handle high volumes of data from a diverse set of sources, generally storing the data in raw formats to promote scalability. Unlike traditional data warehouses, data lakes require minimal preprocessing of ingested data. Rather, data lakes employ a data model where data is stored in raw or semi-processed formats where users may then access and convert the data on demand as needed. Thus, data lakes can be used across different environments to handle the storage of significant amounts of raw, diverse data. However, unstructured storage of data within data lakes may present security risks, particularly where sensitive data is stored within the data lake.

SUMMARY

According to certain examples, a method for attribute access control on a data lake is described. The method includes receiving a data file and metadata associated with the data file. storing the data file in a database, and storing the metadata associated within a data catalog. The metadata is assigned a domain access configuration and an attribute access configuration. A query for the data file is received from a user where the user is assigned a persona from a plurality of personas, and where each persona includes a permission level. The described systems and methods can validate a syntax of the query and invoke a security administrator to evaluate access to the query. The security administrator evaluates the permission level of the assigned persona against the domain access configuration and against the attribute access configuration. In response to determining that the query fails to satisfy one or more of the evaluations, the query is then rejected.

Another example relates to a system including one or more processors configured to receive a data file and metadata associated with the data file, store the data file in a database, and store the metadata associated with the data file in data catalog. The one or more processors may then assign the metadata a domain access configuration and an attribute access configuration. The one or more processors receive a query for the data file from a user, where the user is assigned a persona from a plurality of personas, each persona including a permission level. Syntax of the query is then validated, and a security administrator invoked to evaluate access to the query. The security administrator, executed by the one or more processors, evaluates the permission level of the assigned persona against the domain access configuration and the permission level of the assigned persona against the attribute access configuration. In response to determining that the query fails to satisfy one or more of the evaluations, the one or more processors are configured to reject the query.

A further example relates to a non-transitory computer readable medium comprising instructions that, when executed by one or more processors, cause the one or more processors to receive a data file and metadata associated with the data file, store the data file in a database, and store the metadata associated with the data file in data catalog. The one or more processors may then assign the metadata a domain access configuration and an attribute access configuration. The one or more processors receive a query for the data file from a user, where the user is assigned a persona from a plurality of personas, each persona including a permission level. Syntax of the query is then validated, and a security administrator invoked to evaluate access to the query. The security administrator, executed by the one or more processors, evaluates the permission level of the assigned persona against the domain access configuration and the permission level of the assigned persona against the attribute access configuration. In response to determining that the query fails to satisfy one or more of the evaluations, the one or more processors then reject the query.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION

A full and enabling disclosure is set forth more particularly in the remainder of the specification. The specification makes reference to the following appended figures.

FIG. 4 shows an example process for providing attribute based access control on a data lake according to certain examples.

DETAILED DESCRIPTION

Figure 1:
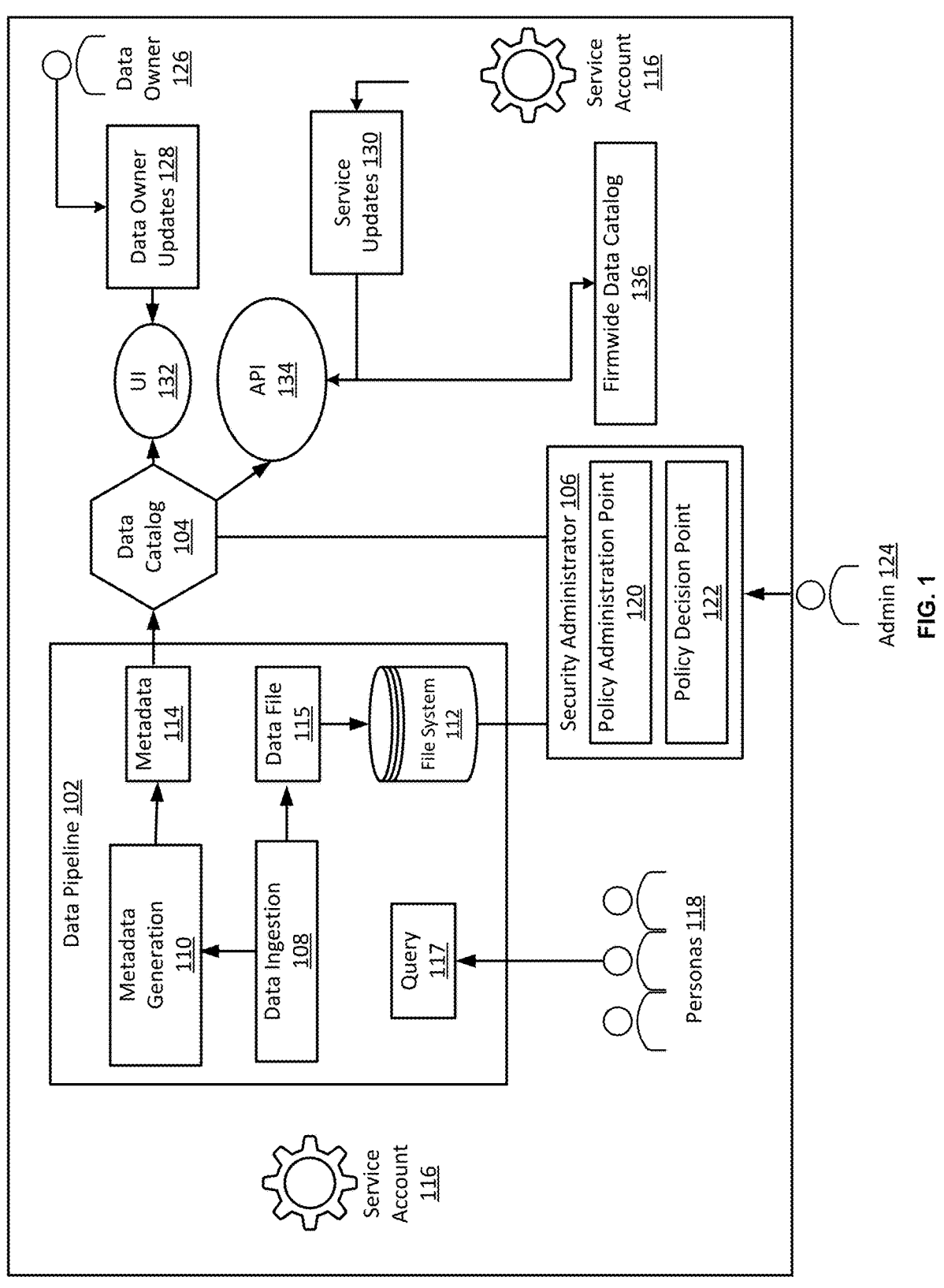
FIG. 1 illustrates a system implementing a security data platform comprising an attribute based access control data lake according to certain examples.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used on another example to yield a still further example. Thus, it is intended that this disclosure include modifications and variations as come within the scope of the appended claims and their equivalents.

Illustrative Example of Attribute Based Access Control in a Data Lake Environment In one illustrative example, a security data platform including attribute based access controls implemented on a data lake is described. The security data platform can include a combination of resources used to ingest data (e.g., via a data pipeline), store the data in a data lake, store metadata defining access to the data in a data catalog, and determine access to the data files, based on the metadata, via a security administrator platform.

The security data platform includes a data pipeline. The data pipeline comprises code used to ingest, transform, and provision data in the security data platform. Off the shelf tools such as Pyspark may be used to build and maintain the pipeline. Distributed file systems such as Hadoop may be used to store data, and tools such as a Hive meta store can capture metadata then transmitted to a data catalog. In an example use case. Software engineers and developers can build the data pipeline, while other users such as production support teams can maintain the data pipelines. Further users, such as service accounts are then used to run the data pipelines in a production environment.

A data catalog of the security data platform may then be used to capture the metadata after ingestion by the data pipeline (e.g., as generated by a Hive metastore). The data catalog provides the capabilities to classify the data files, and update metadata associated with the data files. In the example use case, domain owners and service accounts can utilize user interfaces and APIs to provide assign access configurations (e.g. classifications) and updates to the metadata. In some examples, the data catalog can be integrated with firmwide data catalogs.

A security administrator may then be used to provide an interface to author security policies assigned to the metadata as stored in the data catalog and the associated data files as stored on the distributed file system. The security administrator may also provide a mechanism for evaluating access requests, made by users in different personas, against the previously assigned policies. By controlling access configurations tied to the metadata, where the metadata is associated with respective data files in the data catalog, the security administrator may push down security policies to files as stored on the distributed file system.

Personas, including respective permission levels defining attribute and domain access among other access types, may be provided to users upon onboarding. Depending on the type of user and the method of login, different onboarding services may be applied (e.g., to distinguish service account personas from administrative personas). Tools such as Windows Active Directory and Linux Boks may be implemented to both onboard users into respective personas, and to allow users to adjust their permission level to obtain access to additional data files. Users may request access to different personas based on the operating environment (e.g. a development, test, or production environment).

Once data files are properly classified and tagged based on domain and attribute configurations (e.g., via manipulation of the metadata with the data catalog), a runtime design allows for users to execute queries for data files within the file system and data lake. A user may execute a query using a client tool, the query then submitted to the file system. The file system, integrated to the security administrator, can use the security administrator to validate the query syntax and execute policy decisioning and execution. The security administrator looks up the user's assigned persona's permission level and additionally the access configurations of the data file as identified by the metadata stored in the data catalog to determine if the user has access to the data file. The security administrator then returns the response to the file system. The file system then responds back to the user with the query results.

Example Security Data Platform Architecture

FIG. 1 illustrates a system implementing a security data platform comprising an attribute based access control data lake according to certain examples. The security data platform 100 is shown including a data pipeline 102 for receiving and ingesting data, a data catalog 104 for storage and retrieval of data, and a security administrator 106. The described components operate together to receive data uploaded by various profiles such as service accounts 116, categorize and store such data, and provide selective access to the uploaded data.

The data pipeline 102 comprises code that is used to ingest, transform and provision data in the security data platform 100. Data may be ingested by end users or service accounts 116 uploading datafiles into the security data platform 100 for subsequent retrieval and query by one or more personas. Data ingestion 108 may comprise receiving the data and passing the data to a distributed file system 112 while simultaneously tracking the data received through a simultaneous or asynchronous metadata generation module 110 within the data pipeline 102. Data processing engines such as Pyspark may be used to generate the data pipeline 102.

Different personas 118 are shown. Each persona 118 represents user groups with different roles and responsibilities in different file management environments. Given each persona having different roles and responsibilities, each persona may be designated to have different permission levels to files within the data lake. Examples of different personas include developers, production support, quality assurance, and like. In an example of permission levels afforded to different personas, a developer persona may be granted read/write access in a development environment but may be denied permissions in a production environment. Permission levels may be expanded to correspond to each domain, attribute, zone, or other identifier of a data file as represented by the metadata associated with the data file.

File system 112 comprises a distributed file system hosted by various local servers across a network. Examples of distributed file server implementations can include Hadoop, Lustre, Ceph, and the like. The distributed file system 112 can host the data lake wherein ingested data is received, stored, and categorized, and wherein the categorizations (appended through metadata 114) provide for structured placement and selective access within the file system 112.

While ingested data is passed to the file system 112, data ingestion 108 also includes metadata generation 110 for each datafile received during the data ingestion 108 process. Metadata generated during the ingestion process such as technical metadata (e.g., storage location, size, and the like) and access metadata (e.g., the definition of field and classifications, providing access restrictions and searchability). Access metadata may further be defined per subsequent inputs and procedures across the security data platform 100. Metadata generation 110 may be augmented by tools such as Apache Hive, configured to generate a Hive meta store and Hive tables wherein metadata, such as the technical metadata, is retrieved. Metadata 114 may then be passed from the data pipeline 102 to a data catalog 104.

Data catalog 104 provides the data storage system linking the data files (e.g., those stored in the file system 112) to the metadata 114 to provide data management and access capabilities to the file system 112. Among other functions, the data catalog 104 is able to link the metadata 114 for each data file 115 to access classifications. Access classifications can include different tiers or privilege to be assigned. For example, access classifications can include four tiers such as public, confidential, highly confidential, and restricted, wherein each tier provides additional protections and restrictions on data access for any data associated with the given classification. Any number of access classifications can be defined and provided within the security data platform 100. Such access classifications may be appended to the business metadata for each data file. Hardcoded rules provided by data owners and service accounts may also be used to provide for automatic access classification of the metadata as stored in the data catalog 104. In addition to receiving and implementing access configurations for metadata, the data catalog 104 can perform additional functions such as updating business metadata and additional metadata, via user interfaces and APIs. Data owners and service accounts may use such interfaces to provide access classifications and business metadata. The data catalog 104 may be further integrated with additional data catalogs such as a firmwide data catalog 136 for integration with the larger security data platform 100 network. In implementing the data catalog 104, data governance tools may be used such as Apache Atlas. Oracle Enterprise Metadata Management, and the like.

In addition to receiving metadata 114 from the data pipeline 102, the data catalog also interfaces with a security administrator 106 for implementing access restrictions to files within the distributed file system 112. The security administrator 106 can comprise several services for configuring the execution of security policy within the security data platform 100. For instance, the security administrator 106 is shown including a policy administration point 120 (PAP) and a policy decision point 122 (PDP). Working together these tools can configure and implement access controls for given files within the distributed file system based on the files' metadata including their designated access classifications as retrieved form the data catalog 104.

The policy administration point provides an interface to author security policies which may be pushed down onto file classifications in the file system 112 as retrieved from the data catalog 104. In an implementation, creating security policies at the policy administration point comprises generating flat file structured data such as JSON files that can prescribe how each access classification, as a tagged metadata is to be treated with respect to an access policy. For instance, which personas 118 are able to access specific access classifications, given each persona's access permission level. Security policies at the policy administration point 120 may generally be authored by an administrator 124 within the security data platform 100. Security policies may be configured across different domains such that each domain has its own set of policies. Each domain having its own set of policies can isolate consumptions across domains. The interface for the policy administration point 120 can include data governance tools such as Apache Ranger, Segment, Collibra, and the like.

The policy decision point 122 implements and executes the policies set by the policy administration point 120. The policy decision point 122 may evaluate user access requests against policies that are defined via the policy administration point 120. For example, a user, identified by their persona, may attempt to access a file within the distributed file system

112 (e.g., through a query). Whether the user, based on the user's persona and permission level, is granted or denied access to the file is enforced by the policy decision point 122. Similar data governance tools as described with respect to the policy administration point 120 may be used to implement the policy decision point 122.

Returning to the data catalog 104, the data catalog 104 can capture metadata 114 related to files within the file system 112 as set through interfaces 132 and 134. Interfaces 132 and 134 include a user interface 132 for receiving data owner updates 128 from data owners 126, and an example API 134 for receiving service updates 130 from service accounts 116.

Data owners 126 may represent owners of various domains of data, who are authorized to access and may authorize access to data from the file system associated with the domains which the data owners 126 own. Data owners may have responsibilities on the security data platform 100 for their corresponding domains such as supporting domain data onboarding to the security data platform 100, authorizing new data sources onboarding to the distributed file system 112, and providing entitlements and approving/declining data access requests.

In an example, the data owners 126 can implement updates 128 through providing classification tags (access classifications) and metadata updates to data they own within the data catalog 104 through the user interface 132. Examples of user interface 132 include data governance and metadata frameworks such as Apache Atlas, Immuta, Azure Data Catalog, and the like.

Similarly, service accounts 116 may be configured to administer the data pipeline 102 through defining metadata within the data catalog 104. Through API 134, service accounts can implement service updates 130 each as implementing batch processes where access classification and business metadata are updated, and additional batch processes where metadata for certain files linked in the data catalog 104 can be linked with "UNCLASSIFIED" tags such that a given security policy can set access protocols to the unclassified tags. For instance, the security administrator 106 may be configured to determine the metadata 114 lacks a classification tag, in response, assign the metadata an unclassified tag and reject queries to the metadata 114 and associated data file 115 until the metadata 114 is classified (e.g., by a data owner 126 through UI 132). API 134, providing an interface between the service accounts 116 and the data catalog 104, can include Atlas REST APIs and other standardized data exchange interfaces.

Example Security Data Platform Interface

Figure 2:
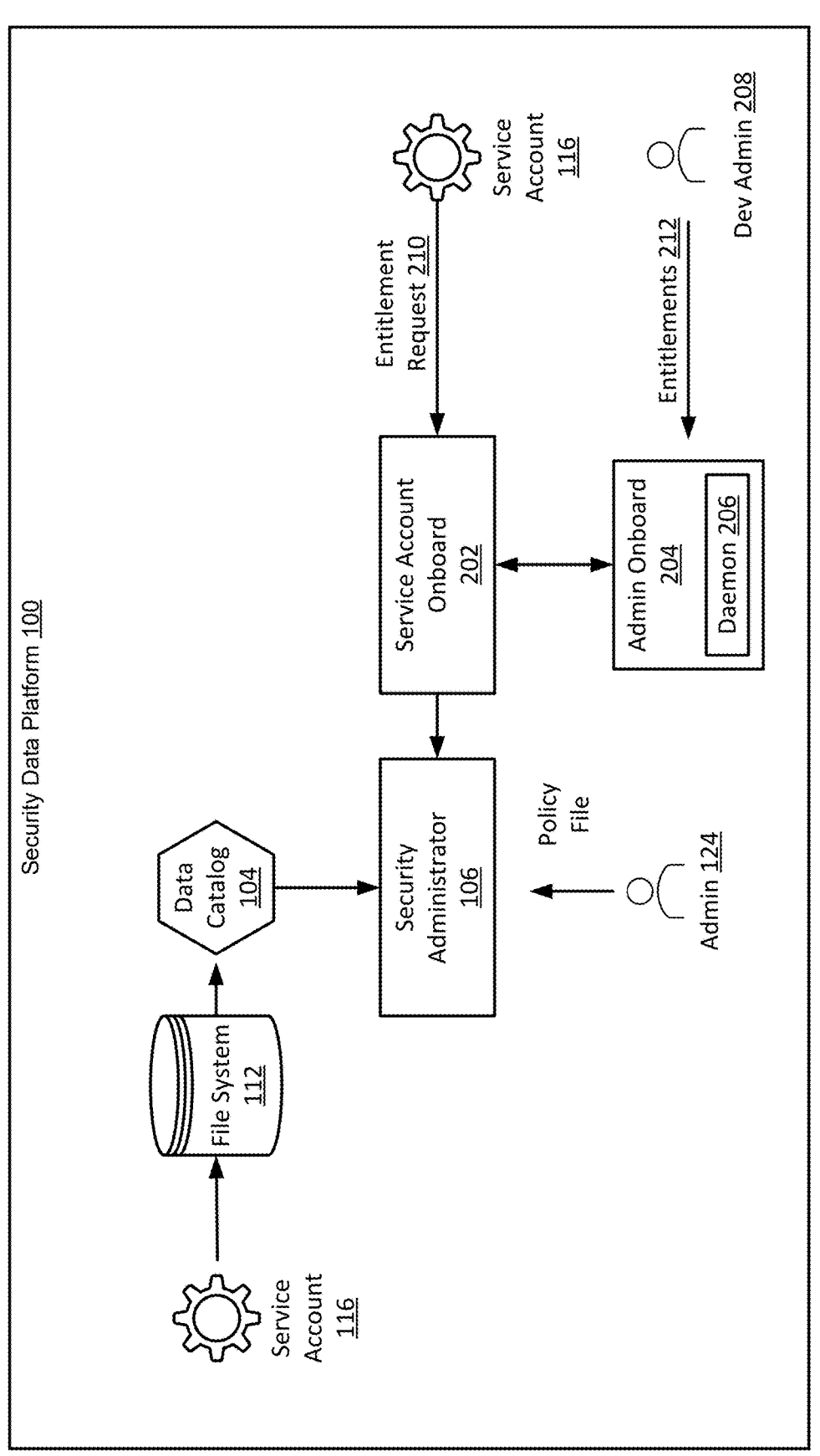
FIG. 2 shows an interface for a security data platform comprising an attribute based access control data lake according to certain examples.

FIG. 2 shows an interface for a security data platform comprising an attribute based access control data lake according to certain examples. Some components are similar to those discussed with respect to FIG. 1 and are referred to with similar numbering. Other implementations are possible. In the example of FIG. 2, service accounts 116 and developer administrators are shown onboarded and interfacing with the security data platform 100.

The service account onboard service 202 provides a means for receiving user inputs and assigning personas to users, the personas relating to the service account 116 persona. According to some examples, the service account onboard service 202 applies an interface such as Windows Active Directory (AD) to onboard personas. Services accounts 116 and users can be assigned AD groups, wherein the AD groups are associated with specific personas. Users can request access various AD groups via requests transmitted to the service account onboard 202, including entitlement requests 210.

Similarly, development administrators 208 can be onboarded through an administrative onboard service 204. According to some examples, the administrative onboard service 204 applies Core Privileged Access Manager (Boks) to manage onboarding of development administrators 208. Development administrators 208 can create and assign entitlements 212 to the security data platform 100. In some examples, development administrators 208 can grant entitlement requests 210 generated by service accounts 116 and received at the service account onboard 202.

The administrative onboard service 204 is shown including a daemon 206. Daemon 206 may be configured to map information between entitlements 212 and service accounts 116. The daemon 206 can be further configured to maintain up time on the security data platform 100 infrastructure (e.g., an underlying Linux layer), and can maintain local cache to store entitlement mappings in case the security data platform 100 is offline.

Once service accounts 116 are onboarded, the service accounts may also interact with the file system 112. As described with respect to FIG. 1, the service accounts can upload data for ingestion by the data pipeline of FIG. 1. Distributed file services such as Hadoop, Spark, and Hive, are configured to push metadata to Atlas via an asynchronous integration (e.g., through Kafka services) for subsequent storage in databases associated with the data catalog (e.g., HBASE disk storage and Infra-Solr memory indices).

Example Data Lake with Attribute Based Access Controls

Figure 3:
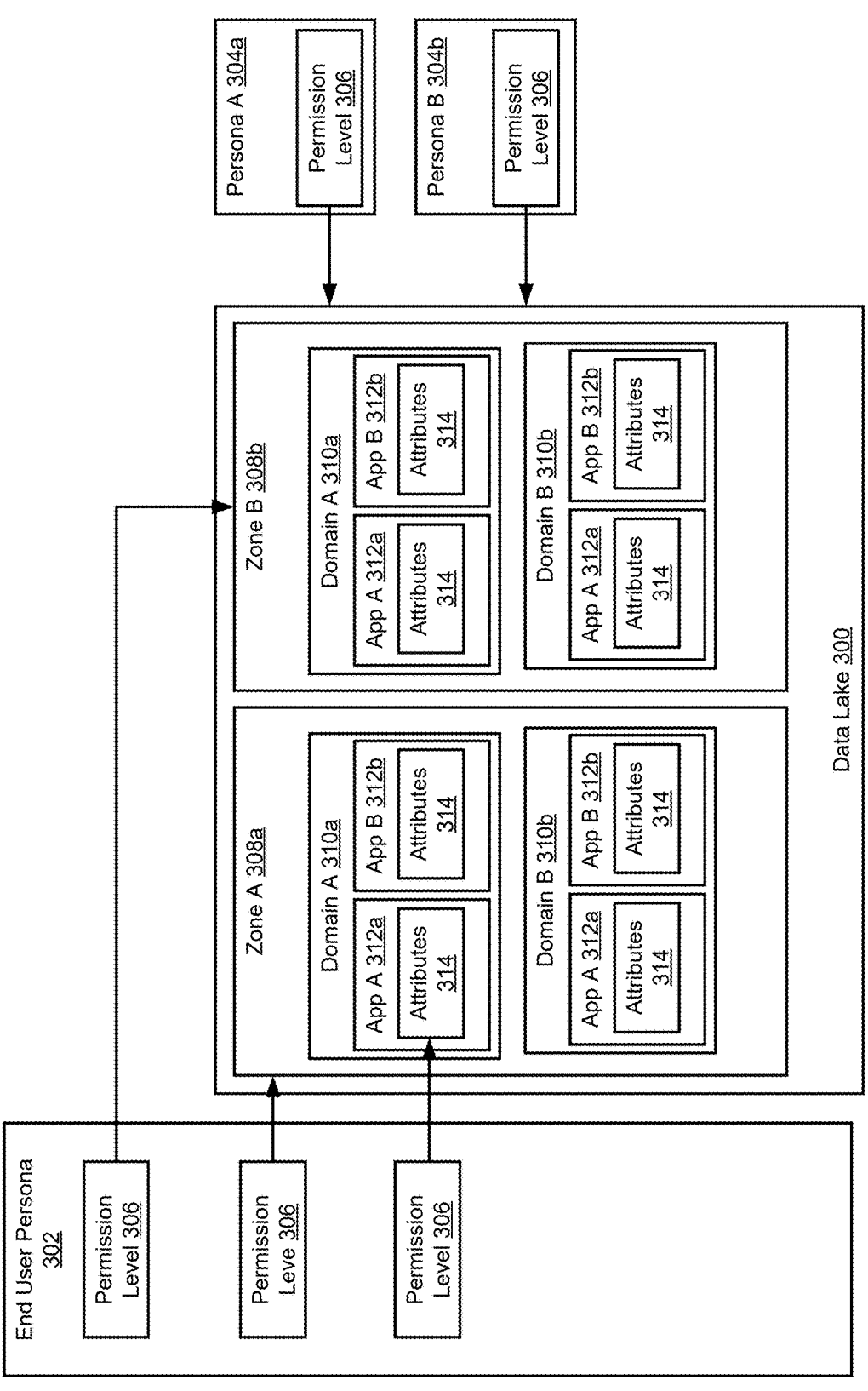
FIG. 3 shows an example of a data lake with attribute based access controls according to certain examples.

FIG. 3 shows an example of a data lake with attribute based access controls according to certain examples. The data lake is shown containing zones 308, the zones containing domains 310, with the domains 310 further containing applications and attributes 314 for representation of various datafile access configurations. Additionally the data lake is shown including end user personas 302 and additional personas.

Zones 308, including Zone A 308a and Zone B 308b provide a logical separation between data categories in the data lake 300. While only two zones 308 are shown, any number of zones may be implemented to provide additional structure to the data lake 300 and optionally define a different the implementation of various access configurations (e.g., each zone being defined by its own access restrictions). As an example, Zone 308a may comprise a raw data zone where the data is unaltered as received from data ingestion. Zone 308b may represent a refined zone wherein data from the raw zone is filtered, processed, transformed and subsequently stored in the refined zone. Additional zones, for instance a curated zone existing between a raw data zone and a refined data zone where data is standardized and cleansed but not yet transformed, may be implemented. Data across different zones 308a 308b may be secured by additional access configurations, requiring specific access configurations to retrieve data from the respective zone (e.g., data across different zones may be secured using additional personas or AD groups).

In another dimension, the data lake 300 is shown including domains 310 within each zone 308. As with zones 308, while only two domains, domain A 310a and domain B 310b are shown, any number of domains may be implemented (e.g., 10+, 20+domains, and so forth). Each domain 310 may have a data owner or data owners who own data within the domain and authorize data access for data within and/or produced by the domain. Domain data owners may be given responsibilities in the security data platform 100 including supporting onboarding of domain data onboarding to the SDP, authorizing new data source onboarding to the data lake 300 (e.g., the including the file system 112) and further provide access entitlements and approve/decline data access requests as discussed with respect to FIG. 2.

Personas 302, 304, may be configured, through respective permission levels 306, to have certain access levels to a particular domain 310. For instance, the permission level 306 of persona 304a may provide read permissions to domain A 310a, while the permission level 306 of persona 304b may be provided write permissions to domain B 310b, while denied any permissions to domain A 310a. In an example, domains are tied to security enforcement policies and can include data security domains, identity domains, risk management domains, external data domains, information security domains, and the like.

In another dimension, the data lake is shown including application IDs 312 in each domain 310 wherein each application ID 312 contains one or more attributes 314. Attributes 314 may be the lowest level of metadata defining a given file within an application ID 312. Examples of attributes 314 include IP address metadata such as vulnerabilities, which App ID or user ID the data belongs to. With respect to the data lake 300, access to a file within the data lake 300 may be determined by whether the permission level 306 for a given persona 302, 304, has an access classification matching the attribute 314 policy. An example, a read only attribute can define the attribute as linked to the security data platform, the relevant domain, the permission levels granted, and the access classification. Example code may correspond as "sdp_app_ro_restricted" indicating that the application domain has read only permissions granted to the restricted group access classification. Such code may be provided for each access classification to define the access privileges (e.g., 'ro' for read only and 'rw' for write).

While attributes defined for end user personas 302 may be applied at the access classification level (e.g., based on the persona's access classification such as "restricted' or "confidential" in a given domain). Other personas 304 may have different permission levels 306, for instance defined at the domain level. Thus, personas 304 may be defined to have different access privileges at a domain level and the attribute level. In an example, persona 304a may relate to a production support team and may be given read only access to the domain a 310a representing an identity domain, example code for corresponding permission level 306 would appear as "sdp_ident_supp_ro". Similarly, persona 304b may relate to a developer team which may be given write access to domain B 310b where domain B 310b represents an application domain. Example code for the corresponding permission level 306 would appear as "sdp_app_developer_rw".

The security data platform 100 is configured to run in different operating environments, for example, development, testing, and production environments, among other environments. Each operating environment may require assigning different levels of access to data files to different personas. For instance, a developer persona may be granted read/write permissions as their permission level when the operating environment is in development mode, but the developer persona may be provided denied access to specific data files while in a production operating environment. Similar cases may be applied to support team personas having broader access permissions in a production operating environment compared to the development operating environment. In such a way, each persona may be assigned corresponding permission levels based in part on the operating environment of the database.

Example Process for Attribute Based Access Control on a Data Lake

FIG. 4 shows an example process for providing attribute based access control on a data lake according to certain examples. For illustrative purposes, the process 400 is described with reference to implementations described above with respect to one or more examples described herein. Other implementations, however, are possible. In some aspects, the operations in FIG. 4 may be implemented in program code that is executed by one or more computing devices such as the security data platform 100 depicted in FIG. 1. In some aspects of the present disclosure, one or more operations shown in FIG. 4 may be omitted or performed in a different order. Similarly, additional operations not shown in FIG. 4 may be performed.

At block 401, the process 400 involves retrieving a data file and metadata 114 associated with the data file 115. Retrieval of the data file 115 may comprise performing operations within the data pipeline 102. For instance retrieval of the data file 115 can comprise data ingestion 108. Data ingestion can include code configured to ingest, transform, and provision data with the security data platform 100. Retrieval may more broadly refer to receipt of a data file 115 from any configuration of data file uploads 115 to the security data platform 100.

At block 402, the process 400 involves storing the data file in a database and storing the metadata 114 associated with the data file 115 in a data catalog 136. Through the data pipeline 102, data ingestion 108 can include provisioning the data file 115 for storage in a file system 112. As discussed with respect to FIG. 1, file system 112 may comprise a distributed file system such as Hadoop, Lustre, Ceph, and the like. The file system 112 may function as a data lake wherein vast amounts of raw data (e.g., a collection of previously received data files 115) are stored in a native format. The file system 112 may store large volumes of diverse data and arrange them into zones based on their structure or level of processing. (e.g., as discussed with respect to FIG. 3). The data file 115, when retrieved or otherwise ingested, can include metadata 114. Metadata 114 can include technical metadata indicating storage properties and the like, and access metadata storing information such as business data or file type classification. In some instances, the data file 115 may lack metadata 114, or lack aspects of metadata necessary for proper provisioning and access designation of the data file 115 within the file system 112. In such instances, metadata 110 may be generated 110 within the data pipeline 102 to create or supplement metadata 114 associated with the data file. Metadata generation 110 can include access to tools such as a Hive table to store and update technical metadata (e.g., the location of the data file 115 in the file system).

At block 403, the process 400 involves assigning the metadata 114 domain access configuration and an attribute access configuration. Domain access configurations, further discussed with respect to FIG. 5, may be set by data owners 126 such as domain data owners 126. In such a way, the strong domain ownership responsibilities may be applied to data owners 126, providing the data owners 126 with complete ownership of data within a given domain. As the data pipeline 102 and file system 112 source data from various domains, domain specific access control, through the domain access configurations, may provide access classifications to data files 115 within the file system 112. Attribute access configurations may be assigned via pertinent metadata 114 retrieved from the data file 115 during data ingestion 108. Attribute access configurations may designate the accessibility (e.g., who has access to the data file 115) based on identified attributes 314 within the metadata 114. The attributes 314 can include IP addresses, App IDs, User IDS, time of data file 115 upload, and any other metadata 114 that can be gathered from the data file 115 during data ingestion 108. In some cases, the user uploading the data file 115 can specify specific attributes 314 and metadata 114 prior to and during the data file 115 upload process to facilitate provisioning the data file 115 within the file system 112.

At block 404, the process 400 involves receiving a query 117 for the data file 115 from a user, wherein the user is assigned a persona from a plurality of personas 118, each comprising a permission level. As described with respect to FIG. 2, a service account onboard service 202 can comprise code configured to assign users to personas among a plurality of personas 118 upon login and access to the security data platform 100. Each persona can comprise a permission level indicating which data files 115 the persona has access to, based on a combination of file domain-type, attribute, and zones as identified by the data file's 115 corresponding metadata 114 as stored in the data catalog 104.

At block 405, the process 400 involves validating a syntax of the query 117. As a form of query pre-processing, the security data platform 100 can inspect the query 117 for proper formatting. For instance, the file system 112 and data catalog 104 may be scanned to determine whether the query 117 would identify whether a data file 115 exists in the file system 112 corresponding to the query 117, regardless of the data file's 115 access configurations assigned in the associated metadata 114. If such a query would fail to identify any data file 115 within the file system 112, then the data file may be identified as lacking proper syntax or not corresponding to any data file 115 within the file system 112. Syntax validation may also comprise reviewing the query for compliance with given query formatting requirements as pertaining to the specific implementation of the query interface (e.g., confirming conformance with a client tool such as Hue, Java Database Connectivity (JDBC), Open Database Connectivity (ODBC), and the like). In such a way, the security data platform 100 can integrate with an array of different query interfaces provided across different client environment.

At block 406, the process 400 involves invoking a security administrator 106 to evaluate access to the query 117. Operations performed by the security administrator 106, once invoked, are further described with respect to blocks 407 and 408. As discussed with respect to FIG. 1, the security administrator 106 can comprise a policy administration point 120 for initial provisioning of access configurations to the metadata 114 of a given data file 115, and a policy decision point 122 for review and execution of access configurations as further described with respect to blocks 407 and 408.

At block 407, the process 400 involves, through the security administrator 106, evaluating the permission level of the assigned persona against the domain access configuration. Retrieved by the security administrator 106 from the data catalog 104, the domain access configuration can indicate the access configuration of the data file 115 with respect to a given domain (e.g., 310a, 310b) within the security data platform 100. In a more simplistic case, the domain access configuration of a given data file 115 may comprise an array of binary values for each domain-permission level pair wherein a value of "1" denotes a given permission level provides complete access to users associated with a given domain (the association designated by the persona permission level). In a more complex case, ordinal numbers or other classification values may be assigned to each domain denoting different levels of access to personas associated with the domain access configuration via associated permission level. For instance, denied access, read only access, and read-write access may be stored to provide the security administrator 106 to determine additional permission levels of the assigned persona.

At block 408, the process 400 involves, through the security administrator, evaluating the permission level of the assigned persona against the attribute access configuration. Similar to block 407, block 408 involves retrieving, via the security administrator 106 and from the data catalog 104, the attribute access configuration. The attribute access configuration can indicate the access configuration of a data file 115 with respect to a given attribute of the data file 115.

In additional block (not shown) the process 400 can involve, through the security administrator 106, evaluating the permission level of the assigned persona against a zone access configuration. Similar procedures may be applied wherein the data file 115, as assigned to different zones within the data lake, may further be tagged with zone access configurations based on the zone. Then, personas with corresponding permission levels may be identified as having access to the data file 115 within the zone, while personas with non-corresponding permission levels may be denied access to the data file 115.

At block 409, the process 400 involves rejecting the query 117 in response to determining that the query fails to satisfy one or more of the evaluations. The security administrator 106, having determined that the persona initiating the query, based on their permission level, lacks the authority and permissions to access the data file 115, can thus prevent the persona from accessing the data file 115. In such a way the security data platform 100 can adhere to data governance principles and control access (such as read access, read-write access and the like) to data files 115 within a file system 112 storing data as a data lake 300.

Figure 5:
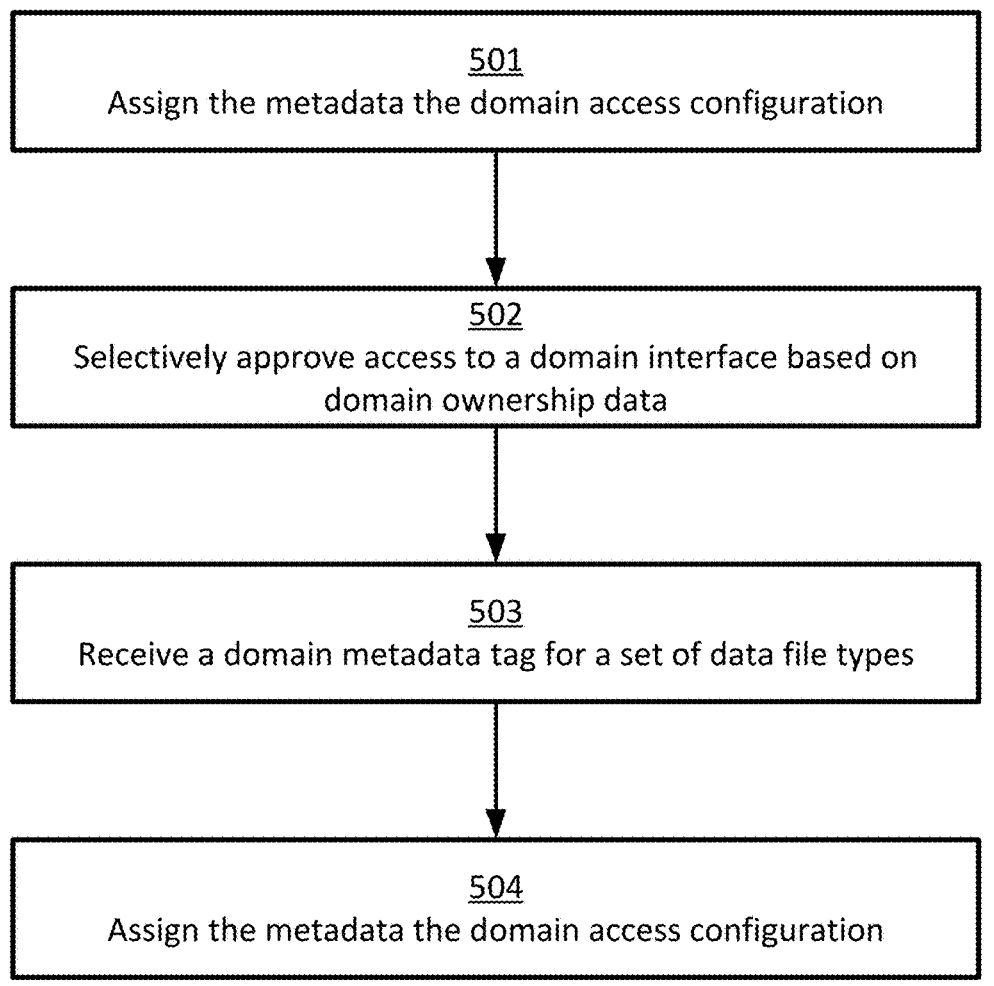
FIG. 5 shows an example process for establishing domain specific access control of the data lake according to certain examples.

Example Process for Establishing Domain Specific Access Control by Domain Owners FIG. 5 shows an example process for establishing domain specific access control of the data lake according to certain examples. For illustrative purposes, the process 500 is described with reference to implementations described above with respect to one or more examples described herein. Other implementations, however, are possible. In some aspects, the operations in FIG. 5 may be implemented in program code that is executed by one or more computing devices such as the security data platform 100 depicted in FIG. 5. In some aspects of the present disclosure, one or more operations shown in FIG. 5 may be omitted or performed in a different order. Similarly, additional operations not shown in FIG. 5 may be performed.

At block 501, the process 500 involves assigning the metadata 114 the domain access configuration. Block 501 is similar to block 403 of process 400, and further illustrates examples that can be combined with process 400 to establish domain specific access control of the data lake while implementing the attribute based access control. Particularly, process 500 describes how, according to certain examples, domain data owners 126 are provided ownership over data within the domain data owners' specific domains.

At block 502, the process 500 involves selectively approving access to a domain interface based on domain ownership data. Selectively approving access to a domain interface (e.g., user interface 132), may be determined based on the credentials of the domain data owner 126 where the domain data owner 126 credentials are established upon user onboarding and login. In one example, a developer admin 208 can login onto the security data platform 100 via an administrative onboard service 204 (e.g., Linux Boks). Logging in through the administrative onboard service 204 may then provide credentials establishing the developer admin 208 as a domain data owner 126 with privileged access to the domain interface 132, wherein the domain data owner 126 can update metadata 114 in the data catalog 104 via the domain interface 132.

At block 503, the process 500 involves receiving a domain metadata tag for a set of data file types. Once access is approved via block 502 to the data domain owner 126, the data domain owner 126 can interact via the domain interface 132 to provide domain specific access control on the source data (i.e., the data file 115) as well as any derivation created from the same. The data domain owner 126 may do so by providing domain metadata tags via the domain interface 132 which then update specified metadata 114 within the data catalog 104. For instance, the domain data owner 126 may append access classification tags (i.e., public, confidential, highly confidential) to the metadata 114 specific to the domain data owner's domain. In such a way, every data file, including source data, originating from a given domain may be assigned a classification tag.

At block 504, the process 500 involves assigning the metadata 114 the domain access configuration. The domain access configuration can include the domain metadata tag (e.g., the access classification including public, confidential, highly confidential and the like) as received at block 503. In the same and additional examples, the process 500 involves assigning the metadata 114 the domain access configuration for all of a specified data type (e.g., based on an identified domain or attribute) as already stored as part of the metadata in the catalog, and can also automatically assign the domain access configuration to all additional data files 115 and metadata 114 upon receipt at the data pipeline 102.

Figure 6:
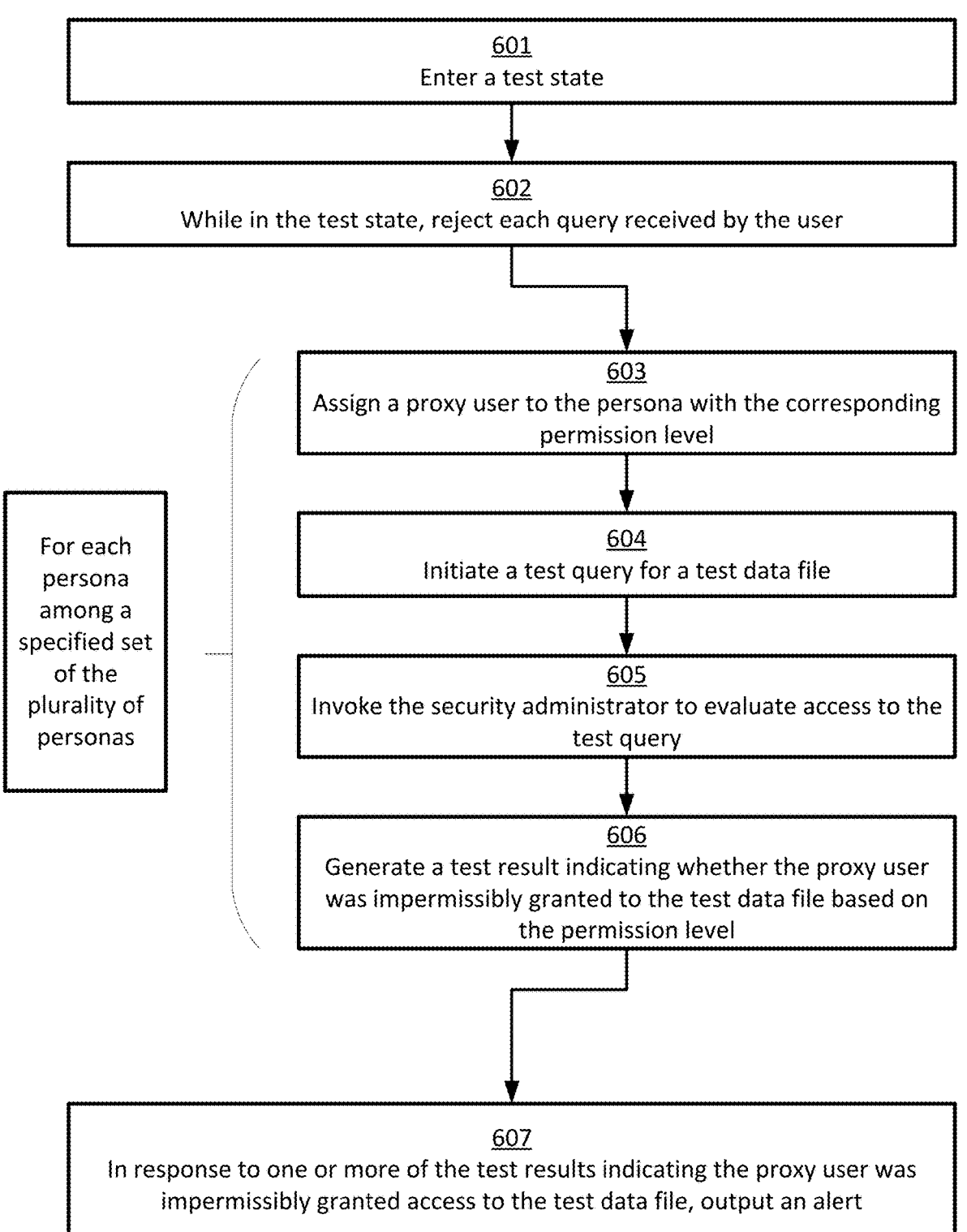
FIG. 6 shows an example process for performing automated testing of the attribute based access control of the data lake according to certain examples.

Example Process for Automated Testing of the Attribute Based Access Control System FIG. 6 shows an example process for performing automated testing of the attribute based access control of the data lake according to certain examples. For illustrative purposes, the process 600 is described with reference to implementations described above with respect to one or more examples described herein. Other implementations, however, are possible. In some aspects, the operations in FIG. 6 may be implemented in program code that is executed by one or more computing devices such as the security data platform 100 depicted in FIG. 6. In some aspects of the present disclosure, one or more operations shown in FIG. 6 may be omitted or performed in a different order. Similarly, additional operations not shown in FIG. 6 may be performed.

At block 601, the process 600 involves entering a test state. Entering a test state, as further outlined in blocks 602-607, may allow for the automated testing of the security data platform 100. In some examples, entering the test state can occur on a scheduled basis. For instance, an administrator 124 may configure the security data platform to enter the test state periodically, and/or after specified maintenance activity to ensure the proper functionality of the security data platform 100.

At block 602, the process 600 involves, while in the test state, rejecting each query 117 received by the user. The security data platform 100 may be configured to reject each query from every user with access to the security data platform 100, or alternatively, prevent such user's from accessing the security data platform 100. In such a way, the security data platform 100 can execute tests and identify potential lapses in protections (e.g., wherein a specific persona has access to a data file specified to be accessible only by other personas, or where a data file 115 with an assigned access classification of restricted is accessible only to users who are provided with heightened permission levels).

The process 600 is shown to iteratively perform blocks 603-606 for each persona of a specified set of the plurality of personas 118. The specified set of personas to be tested may comprise every persona within the security data platform 100, a single persona within the security data platform, or the set of personas to be tested may be specified by a user such as a system administrator 124 responsible for testing and management of the security data platform 100.

At block 604, the process 600 involves assigning a proxy user to the persona with the corresponding permission level. The proxy user need not be a physical user and instead may comprise a test file including code configured for testing the permission level of the persona. The test file can for instance include instructions to submit one or more test queries for access to one or more data files stored in the file system.

At block 605, the process 600 involves initiating a test query for a test data file. Like queries initiated by other personas/users the test query can be initiated by transmitting a request via query interface such as SQL. The proxy user, when automated, comprises code configured to generate the test query. In some examples, multiple test queries may be generated where each test query can request different access to a data file (e.g., read access and write access). In the same or other examples, the multiple test queries can request access to different data files with different domain, attribute, and/or zone access configurations. The proxy user, when comprising a test file, may be configured to generate any number of permutation of test queries to test the permission level of the associated persona.

At block 606, the process 600 involves invoking the security administrator 106 to evaluate access to the test query. Invocation of the security administrator 106 at block 606 is similar to the invocation at block 406 as discussed with respect to process 400. The security administrator 106, on invocation can evaluate the permission level of the assigned persona of the proxy user against domain access configurations, attribute access configurations, zone access configurations, and the like. In such a manner, the security administrator can test the functionality of the security data platform components.

At block 607, the process 600 involves outputting an alert in response to one or more of the test results (per blocks 605-606) indicating the proxy user was impermissibly granted access to the test data file. Alerts may also be generated indicating when the proxy user was impermissibly denied access to the test data file (e.g., when the proxy user's persona has a permission level indicating matches the access configuration of the test data file such that the proxy user should be able to access the test data file but is otherwise rejected).

Figure 7:
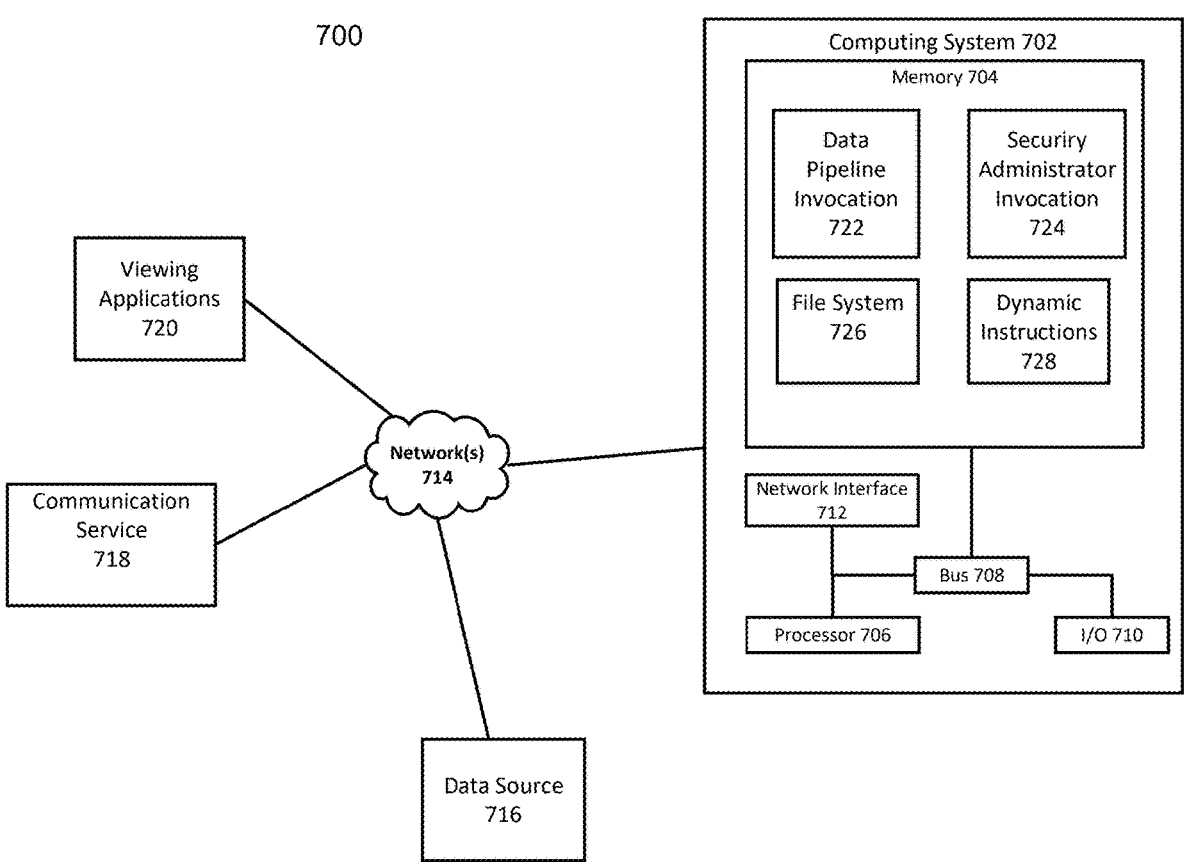
FIG. 7 shows a block diagram for an example computing environment capable of executing the described systems and methods, according to certain examples.

Example Computing Environment for Implementing Attribute Based Access Control on a Data Lake Any suitable computing system or group of computing systems can be used for performing the operations described herein. For example, FIG. 7 shows a block diagram for an example computing environment capable of executing the described systems and methods, according to certain examples.

The depicted example of a computing system 702 includes one or more processors 706 communicatively coupled to one or more memory devices 704. The processor 706 executes computer-executable program code or accesses information stored in the memory device 704. Examples of processor 706 include a microprocessor, an application-specific integrated circuit ("ASIC"), a field-programmable gate array ("FPGA"), or other suitable processing device. The processor 706 can include any number of processing devices, including one.

The memory device 704 includes any suitable non-transitory computer readable medium for storing the data pipeline 722, security administrator 724, file system 726 and other dynamic objects 728 or received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 702 may also include a number of external or internal devices such as input or output devices. For example, the computing system 702 is shown with an input/output ("I/O") interface 608 that can receive input from input devices or provide output to output devices. A bus 708 can also be included in the computing system 702. The bus 708 can communicatively couple one or more components of the computing system 702.

The computing system 702 executes program code that configures the processor 706 to perform one or more of the operations described above with respect to FIGS. 1-6. The program code includes operations related to, for example, receiving and ingesting data files, generating metadata associated with the data files, and determining access to the data files, or other suitable applications or memory structures that perform one or more operations described herein. The program code may be resident in the memory device 704 or any suitable non-transitory computer-readable medium and may be executed by the processor 706 or any other suitable processor. In some embodiments, the program code described above, including the data pipeline 722, security administrator 724, file system 726 and other dynamic objects 728 or received or determined values or data objects are stored in the memory device 704, as depicted in FIG. 7. In additional or alternative embodiments, one or more of the data pipeline 722, security administrator 724, file system 726 and other dynamic objects 728 or received or determined values or data objects described above are stored in one or more memory devices accessible via a data network, such as a memory device accessible via a cloud service.

The computing system 702 depicted in FIG. 7 also includes at least one network interface 712. The network interface 712 includes any device or group of devices suitable for establishing a wired or wireless data connection to one or more data networks 714 such as viewing applications 730 including user interfaces. Non-limiting examples of the network interface 712 include an Ethernet network adapter, a modem, and/or the like. A remote communication service 718 is connected to the computing system 702 via network 712 and can perform some of the operations described herein including generating templates or receiving messaging data and applying the messaging data to a specified template. The computing system 702 is able to communicate with one or more of the remote communication service 718 and the security data platform using the network interface 710. Although FIG. 7 depicts the security data platform as connected to computing system 702 via the networks 712, other embodiments are possible, including the data pipeline 722 or code calling the execution of the data pipeline 722 running as a program in the memory device 704 of computing system 702.

Advantages of Systems and Methods for a Message Dispatch Application

The described systems and methods provide improvements to database management in providing access control associated with attributes and users. As described herein, certain embodiments provide improvements to online computing environments by solving problems that are specific to data storage and access on distributed computing environments and data lakes through utilizing specific configurations of domain, attribute, and zone attribute based access control securely storing data in online computing environments. For example, the disclosures presented herein presents a particular solution to the problem of database access control through storing data files and metadata associated with data files in separate databases, one a data lake and the other a data catalog. The metadata may be assigned various access configurations, as stored in the data catalog for retrieval by a security administrator which can evaluate access to the data file requested by a query. This particular way generating and indexing data files along with metadata associated with the data files objects allows both data augmentation and data security to be achieved in data transmission and access requests.

The described systems and methods provide further improvements to database management in providing automated means for testing the functionality and security of the security data platform, including the testing of permission levels proxy users. Different personas may be replicated including developers, production support, data analysts and the like. By executing such testing on scheduled bases including after maintenance activity, the health and stability of the security data platform can be monitored to ensure proper functionality and to prevent the transmission of restricted data to users with denied access to such data files. In such a way, automated testing via implementation of proxy users in a test environment can further improve the technical art of file access within distributed computing environments including data lakes.

General Considerations

Although the subject matter has been described in language specific to structural features or methodological acts, it is to be understood that the subject matter of the appended claims is not necessarily limited to the specific features or acts described above. Rather, the specific features and acts described above are disclosed as examples.

Various operations of examples are provided herein. The order in which one or more or all of the operations are described should not be construed as to imply that these operations are necessarily order dependent. Alternative ordering will be appreciated based on this description. Further, not all operations may necessarily be present in each example provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, or an ordering. Rather, such terms are merely used as identifiers, names, for features, elements, or items. For example, a first state and a second state generally correspond to state 1 and state 2 or two different or two identical states or the same state. Additionally, "comprising," "comprises," "including," "includes," or the like generally means comprising or including.

Although the disclosure has been shown and described with respect to one or more implementations, equivalent alterations and modifications will occur based on a reading and understanding of this specification and the drawings. The disclosure includes all such modifications and alterations and is limited only by the scope of the following claims.

What is claimed is:

1. A method comprising:

receiving a data file and metadata associated with the data file;

storing the data file in a database, and storing the metadata associated with the data in a data catalog;

assigning the metadata a domain access configuration and an attribute access configuration;

receiving a query for the data file from a user, wherein the user is assigned a persona from a plurality of personas, each comprising a permission level;

validating a syntax of the query;

invoking a security administrator to evaluate access to the query through steps comprising:

evaluating the permission level of the assigned persona against the domain access configuration;

evaluating the permission level of the assigned persona against the attribute access configuration; and in response to determining, by the security administrator, that the query fails to satisfy one or more of the evaluations, rejecting the query; and automatically testing the security administrator through steps comprising:

entering a test state, wherein each query received by the user is rejected;

for each persona of a specified set of the plurality of personas:

assigning a proxy user to the persona with the corresponding permission level;

initiating a test query for a test data file;

invoking the security administrator to evaluate access to the test query; and generating a test result indicating whether the proxy user was impermissibly granted access to the test data file based on the permission level; and in response to one or more of the test results indicating the proxy user was impermissibly granted access to the test data file, outputting an alert.

2. The method of claim 1, wherein assigning the metadata the domain access configuration comprises:

selectively approving access to a domain interface based on domain ownership data;

receiving a domain metadata tag for a set of data file types; and assigning the metadata the domain access configuration.

3. The method of claim 1, wherein the metadata is further assigned a zone access configuration, and the security administrator further evaluates access to the query through evaluating the permission level against the zone access configuration.

4. The method of claim 1, wherein the metadata, upon invocation of the security administrator, lacks a classification tag, further wherein in response, the metadata is assigned an unclassified tag, and rejecting the query.

5. The method of claim 1, wherein invoking the security administrator comprises transmitting the metadata to the security administrator via asynchronous integration.

6. The method of claim 1, wherein each persona is assigned the corresponding permission level based in part on an operating environment of the database.

7. A system comprising
one or more processors configured to:
receive a data file and metadata associated with the data file;
store the data file in a database, and store the metadata associated with the data file in data catalog;
assign the metadata a domain access configuration and an attribute access configuration;
receive a query for the data file from a user, wherein the user is assigned a persona from a plurality of personas, each comprising a permission level;
validate a syntax of the query;
invoke a security administrator to evaluate access to the query through steps comprising:
evaluating the permission level of the assigned persona against the domain access configuration;
evaluating the permission level of the assigned persona against the attribute access configuration;
in response to determining, by the security administrator, that the query fails to satisfy one or more of the evaluations, reject the query; and
automatically testing the security administrator through steps comprising:
entering a test state, wherein each query received by the user is rejected;
for each persona of a specified set of the plurality of personas:
assigning a proxy user to the persona with the corresponding permission level;
initiating a test query for a test data file;
invoking the security administrator to evaluate access to the test query; and
generating a test result indicating whether the proxy user was impermissibly granted access to the test data file based on the permission level; and
in response to one or more of the test results indicating the proxy user was impermissibly granted access to the test data file, outputting an alert.

8. The system of claim 7, wherein the one or more processors are further configured to:
selectively approve access to a domain interface based on domain ownership data;
receive a domain metadata tag for a set of data file types; and
assign the metadata the domain access configuration.

9. The system of claim 7, wherein one or more processors are further configured to:
assign the metadata a zone access configuration; and
invoke the security administrator to further evaluate access to the query through evaluating the permission level against the zone access configuration.

10. The system of claim 7, wherein the metadata, upon invocation of the security administrator, lacks a classification tag, further wherein in response, the one or more processors are further configured to assign an unclassified tag, and reject the query.

11. The system of claim 7, wherein, in invoking the security administrator, the one or more processors are further configured to transmit the metadata to the security administrator via asynchronous integration.

12. The system of claim 7, wherein the one or more processors are further configured to assign each persona the corresponding permission level based in part on an operating environment of the database.

13. A non-transitory computer readable medium comprising instructions that, when executed by one or more processors, cause the one or more processors to:
receive a data file and metadata associated with the data file;
store the data file in a database, and store the metadata associated with the data file in a data catalog;
assign the metadata a domain access configuration and an attribute access configuration;
receive a query for the data file from a user, wherein the user is assigned a persona from a plurality of personas, each comprising a permission level;
validate a syntax of the query;
invoke a security administrator to evaluate access to the query through steps comprising:
evaluating the permission level of the assigned persona against the domain access configuration;
evaluating the permission level of the assigned persona against the attribute access configuration;
in response to determining, by the security administrator, that the query fails to satisfy one or more of the evaluations, reject the query; and
automatically testing the security administrator through steps comprising:
entering a test state, wherein each query received by the user is rejected;
for each persona of a specified set of the plurality of personas:
assigning a proxy user to the persona with the corresponding permission level;
initiating a test query for a test data file;
invoking the security administrator to evaluate access to the test query; and
generating a test result indicating whether the proxy user was impermissibly granted access to the test data file based on the permission level; and
in response to one or more of the test results indicating the proxy user was impermissibly granted access to the test data file, outputting an alert.

14. The non-transitory computer readable medium of claim 13, the non-transitory computer readable medium storing further instructions that, when executed by one or more processors, cause the one or more processors to:

selectively approve access to a domain interface based on domain ownership data;

receive a domain metadata tag for a set of data file types; and assign the metadata the domain access configuration.

15. The non-transitory computer readable medium of claim 13, the non-transitory computer readable medium storing further instructions that, when executed by one or more processors, cause the one or more processors to:

assign the metadata a zone access configuration; and invoke the security administrator to further evaluate access to the query through evaluating the permission level against the zone access configuration.

16. The non-transitory computer readable medium of claim 13, wherein the metadata, upon invocation of the security administrator, lacks a classification tag, further wherein in response, the one or more processors are further caused to assign an unclassified tag, and reject the query.

\* \* \* \* \*